United States Patent
Nishiyama (10) Patent No.: US 10,341,519 B2
(45) Date of Patent: Jul. 2, 2019

(54) COMMUNICATION SYSTEM, IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Masashi Nishiyama, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/817,563

(22) Filed: Nov. 20, 2017

(65) Prior Publication Data

US 2018/0160002 A1    Jun. 7, 2018

(30) Foreign Application Priority Data

Dec. 6, 2016   (JP) ................ 2016-237091

(51) Int. Cl.
*H04N 1/00* (2006.01)
*H04N 1/32* (2006.01)
*H04W 4/80* (2018.01)
*H04W 76/14* (2018.01)
*H04N 1/327* (2006.01)

(52) U.S. Cl.
CPC ..... *H04N 1/00973* (2013.01); *H04N 1/00307* (2013.01); *H04N 1/32776* (2013.01); *H04W 4/80* (2018.02); *H04W 76/14* (2018.02); *H04N 2201/0055* (2013.01); *H04N 2201/0081* (2013.01); *H04N 2201/0082* (2013.01); *H04N 2201/3264* (2013.01)

(58) Field of Classification Search
None
See application file for complete search history.

(56) References Cited

U.S. PATENT DOCUMENTS

| 5,787,308 A |  | 7/1998 | Suzuki et al. |  |
| 9,712,686 B1 | * | 7/2017 | Zakharov | H04N 1/00029 |
| 2004/0064762 A1 | * | 4/2004 | Deshpande | G06F 11/0733 |
|  |  |  |  | 714/44 |
| 2007/0005157 A1 | * | 1/2007 | Tanimoto | G05B 23/0213 |
|  |  |  |  | 700/65 |
| 2007/0280200 A1 | * | 12/2007 | Patel | H04M 1/2535 |
|  |  |  |  | 370/352 |

(Continued)

FOREIGN PATENT DOCUMENTS

| JP | 2005-094659 | * | 4/2005 | H04M 11/00 |
| JP | 2005208974 A |  | 8/2005 |  |

*Primary Examiner* — Beniyam Menberu
(74) *Attorney, Agent, or Firm* — Venable LLP (57) ABSTRACT

In a communication system, in which an image forming apparatus and an information processing apparatus are connected via a network and remote maintenance is performed between the image forming apparatus and the information processing apparatus, the image forming apparatus has a wireless communication unit for performing wireless communication with a mobile terminal and determines whether or not remote maintenance using the mobile terminal is possible. In a case that it is determined that the remote maintenance is possible, the image forming apparatus establishes wireless communication with the mobile terminal in response to a connection request from the mobile terminal, and performs input/output of audio data via the mobile terminal with the information processing apparatus.

10 Claims, 7 Drawing Sheets

(56) References Cited

U.S. PATENT DOCUMENTS

| | | | |
|---|---|---|---|
| 2009/0156193 A1* | 6/2009 | Urbanija | H04M 1/2155 |
| | | | 455/420 |
| 2009/0238396 A1* | 9/2009 | Lin | H04R 5/02 |
| | | | 381/370 |
| 2011/0122435 A1 | 5/2011 | Nishiyama | |
| 2013/0216027 A1* | 8/2013 | Rados | H04M 3/51 |
| | | | 379/32.01 |
| 2014/0293333 A1* | 10/2014 | Asai | G06F 3/1236 |
| | | | 358/1.15 |
| 2015/0373123 A1* | 12/2015 | Warrick | H04L 67/30 |
| | | | 709/228 |
| 2016/0118036 A1* | 4/2016 | Cheatham, III | G10K 11/178 |
| | | | 380/252 |
| 2016/0219329 A1* | 7/2016 | Jee | H04N 21/4367 |
| 2016/0224947 A1* | 8/2016 | Ishimaru | G06Q 10/20 |
| 2017/0041977 A1* | 2/2017 | Yokoyama | H04L 63/083 |
| 2017/0156172 A1* | 6/2017 | Yokoyama | H04W 68/12 |
| 2018/0249039 A1* | 8/2018 | Nakagawa | H04N 1/33376 |

* cited by examiner

COMMUNICATION SYSTEM, IMAGE FORMING APPARATUS, METHOD OF CONTROLLING THE SAME, AND STORAGE MEDIUM

BACKGROUND OF THE INVENTION

Field of the Invention

The present invention relates to a communication system, an image forming apparatus, a method of controlling the same, and a storage medium.

Description of the Related Art

As methods of handling trouble with a product have become complex, users frequently ask a question of the call center of a manufacturer and obtain a reply. For example, Japanese Patent Laid-Open No. 2005-208974 proposes a remote maintenance system between an image forming apparatus and a call center for swiftly performing processing for handling trouble with the image forming apparatus. By this remote maintenance system, when trouble occurs in the image forming apparatus, it is possible to resolve the trouble with the image forming apparatus remotely, without an employee of the call center visiting the site where the image forming apparatus is. By this, the time required for movement by a maintenance employee is saved, and it is possible to shorten the time it takes to solve the trouble. In such a remote maintenance system, it is effective if a user of the image forming apparatus communicates with the call center by using a communication unit of the image forming apparatus, without using an apparatus other than the image forming apparatus such as a PC.

In a case of communicating with the call center by using the communication unit of the image forming apparatus, a user must perform an audio call with the call center using an audio device installed in the image forming apparatus, and in this case the user must stand close to the audio device. Meanwhile, during maintenance in accordance with the remote maintenance system, there are cases where the user goes around to a back surface of the image forming apparatus, and there are also cases where the user confirms a setting in a PC that inputs a print job to the image forming apparatus. In such cases, because the user separates from the audio device of the image forming apparatus, there is a problem in that it ceases to be possible to continue the conversation with an operator of the call center.

SUMMARY OF THE INVENTION

An aspect of the present invention is to eliminate the above-mentioned problem with conventional technology.

A feature of the present invention is to provide a technique for, during remote maintenance, enabling a user to continue a call with an operator of an information processing apparatus by using a mobile terminal, even if the user must perform work after separating from an image forming apparatus.

According to a first aspect of the present invention, there is provided a communication system, in which an image forming apparatus and an information processing apparatus are connected via a network and remote maintenance is performed between the image forming apparatus and the information processing apparatus, wherein the image forming apparatus comprises: a memory that stores a set of instructions; and at least one processor that executes the instructions to: control the remote maintenance with the information processing apparatus; perform wireless communication with a mobile terminal; determine whether or not the remote maintenance is possible using the mobile terminal; and control to, in a case that it is determined that the remote maintenance is possible, establish wireless communication with the mobile terminal in response to a connection request from the mobile terminal, and perform input and output of audio data via the mobile terminal with the information processing apparatus, wherein an operator of the information processing apparatus calls a user of the image forming apparatus via the mobile terminal at a time of the remote maintenance.

According to a second aspect of the present invention, there is provided an image forming apparatus operable to connect to an information processing apparatus via a network and capable of receiving remote maintenance from the information processing apparatus, the image forming apparatus comprising: a memory device that stores a set of instructions; and at least one processor that executes the instructions to: control the remote maintenance with the information processing apparatus; perform wireless communication with a mobile terminal; determine whether or not the remote maintenance is possible using the mobile terminal; and control to, in a case that it is determined that the remote maintenance is possible, establish wireless communication with the mobile terminal in response to a connection request from the mobile terminal, and perform input and output of audio data via the mobile terminal with the information processing apparatus, wherein an operator of the information processing apparatus calls a user of the image forming apparatus via the mobile terminal at a time of the remote maintenance.

According to a third aspect of the present invention, there is provided a method of controlling an image forming apparatus connected to an information processing apparatus via a network and having a remote maintenance control unit for controlling remote maintenance with the information processing apparatus and a wireless communication unit for performing wireless communication with a mobile terminal, and operable to receive remote maintenance from the information processing apparatus, the method comprising: determining whether or not the remote maintenance is possible using the mobile terminal; and controlling to, in a case that the remote maintenance is determined to be possible, establish wireless communication with the mobile terminal by the wireless communication unit in response to a connection request from the mobile terminal, and perform input and output of audio data via the remote maintenance control unit, wherein an operator of the information processing apparatus calls a user of the image forming apparatus via the mobile terminal at a time of the remote maintenance.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention.

First Embodiment

Figure 1:
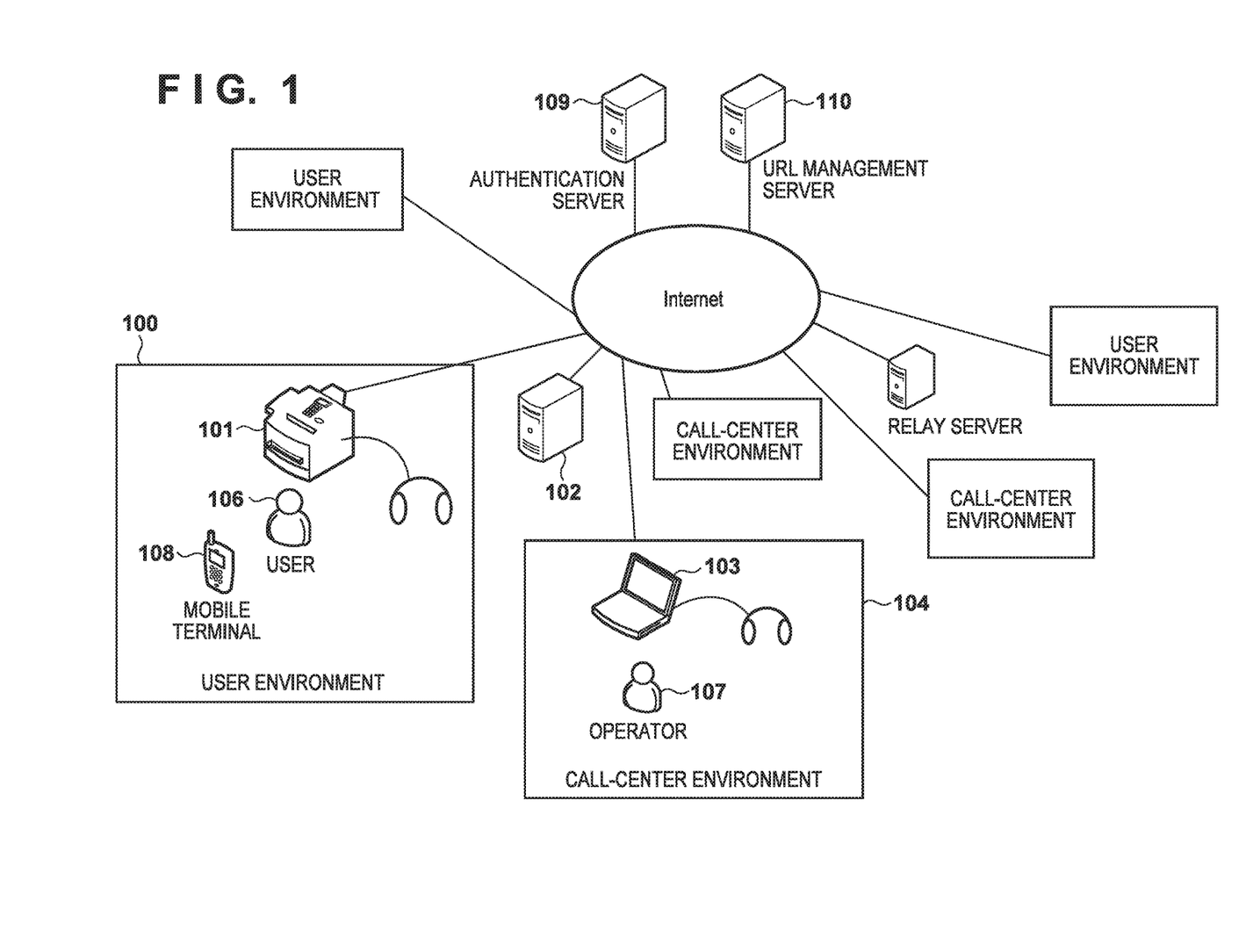
FIG. 1 depicts a view for describing a configuration of a communication system that can implement remote maintenance according to a first embodiment of the present invention.

FIG. 1 depicts a view for describing a configuration of a communication system (a remote maintenance system) that can implement remote maintenance according to a first embodiment of the present invention.

Here, a user environment 100 includes an image forming apparatus 101, a user 106, and a mobile terminal 108 operated by the user. In addition, a call center environment 104 includes an operator 107, and a terminal apparatus (an information processing apparatus) 103 that the operator 107 uses.

The image forming apparatus 101 has remote maintenance functions such as remote operation and audio or moving image communication. At a time of remote maintenance, the terminal apparatus 103 operates as a communication partner of the image forming apparatus 101. A relay server 102 is provided with a communication function as an HTTP server. The relay server 102 acts as a relay between the image forming apparatus 101 and the terminal apparatus 103. The image forming apparatus 101 and the terminal apparatus 103 are provided with a communication function as an HTTP client. In a data communication in accordance with HTTP, the HTTP clients perform data communication with each other by performing POST/GET to a URL (Uniform Resource Locator) provided from the HTTP server. Accordingly, the HTTP clients can perform data communication with each other without being blocked by a private address area or an FW (Firewall).

Because both of the image forming apparatus 101 and the terminal apparatus 103 have an audio device, the user 106 and the operator 107 of the terminal apparatus 103 can perform an audio call at the time of remote maintenance. The mobile terminal 108 is a smart device such as a smart phone or a tablet, and incorporates a speaker and a microphone for an audio call.

An authentication server 109 is a server for providing an authentication function. When the image forming apparatus 101 and the terminal apparatus 103 connect to the relay server 102, authentication token information must be obtained in advance by performing authentication by the authentication server 109. A URL management server 110 is a server for managing a URL of the relay server 102. When the image forming apparatus 101 and the terminal apparatus 103 connect to the relay server 102, they obtain a URL for the relay server 102 from the URL management server 110 in advance. Note that configuration may be such that the user 106 and the operator 107 have set the URL of the relay server in the image forming apparatus 101 and the terminal apparatus 103 in advance without using the URL management server 110.

The image forming apparatus 101 and the terminal apparatus 103 each connect to the relay server 102, but the relay server 102 must identify both as communication partners. In the first embodiment, as a method of identifying a communication partner, a method in which a connection number is used is employed. When the image forming apparatus 101 connects with the relay server 102, the relay server 102 issues a connection number. When the terminal apparatus 103 connects with the relay server 102, this connection number is designated. The relay server 102 identifies two entities whose connection numbers match as communication partners. Note that, although the image forming apparatus 101 was given as the issuing source of the connection number, configuration may be such that the terminal apparatus 103 is the issuing source, and the image forming apparatus 101 is designated with the connection number. It is envisioned that the connection number is separately conveyed by telephone or electronic mail between the user 106 and the operator 107. Note that, in the first embodiment, it is assumed that the image forming apparatus 101 and the terminal apparatus 103 communicate by using HTTP, via the relay server 102. However, the present invention is not limited to this, and configuration may be such that a protocol other than HTTP is used for communication with the relay server 102, or such that direct communication that does not go through the relay server 102 is performed.

Figure 2:
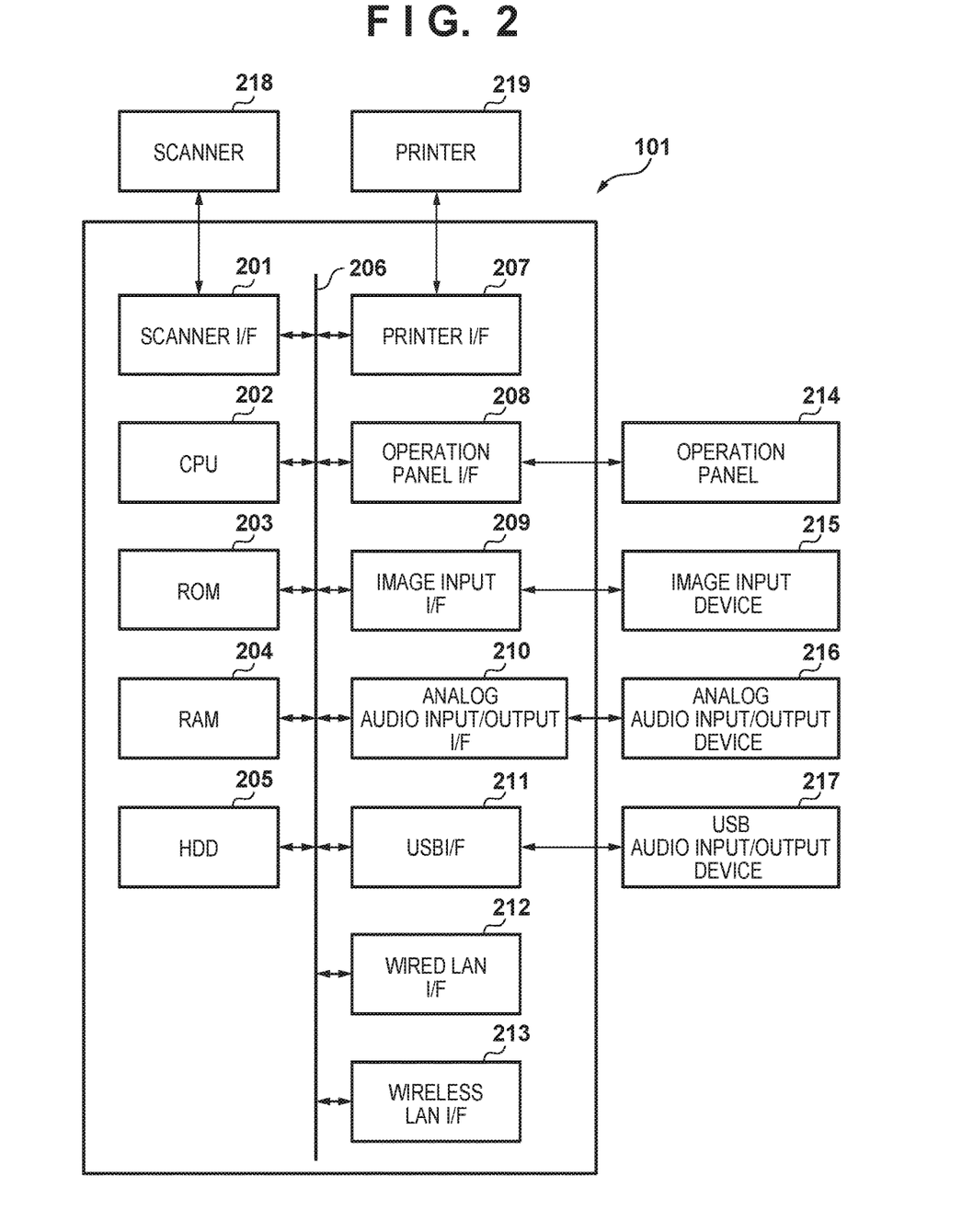
FIG. 2 is a block diagram for describing a hardware configuration of an image forming apparatus according to the first embodiment.

FIG. 2 is a block diagram for describing a hardware configuration of the image forming apparatus 101 according to the first embodiment.

In the image forming apparatus 101, a CPU 202 deploys a program stored in a ROM 203 or a hard disk (HDD) 205 into a RAM 204, and executes the program to comprehensively control access to various devices connected to a system bus 206. The ROM 203 stores control programs and the like that the CPU 202 can execute. The RAM 204 mainly functions as a main memory, a work area, or the like, of the CPU 202, and is configured such that a memory capacity can be extended by option RAM connected to an expansion port (not shown). The HDD 205 stores a program, various applications, font data, user files, and edit files. Note that the HDD 205 is used in the first embodiment, but configuration may be taken to use, other than the HDD 205, an SD card, a flash memory, or the like as an external storage apparatus. A scanner I/F (interface) 201 controls input of image data from a scanner 218. A printer I/F 207 controls output of image data to a printer 219. An operation panel I/F 208 controls a display of an operation panel (an operation unit) 214 and controls input of various setting information, data or instructions from a user via the operation panel 214. An image input I/F 209 controls input of image data from an image input device 215 such as a camera or the like. An analog audio input/output I/F 210 is equipped with terminals for an analog microphone and speaker, and controls input and output with an analog audio input/output device 216. A USB (Universal Serial Bus) I/F 211 is equipped with a USB terminal, and controls input and output with a USB audio input/output device 217 such as a headset that supports USB. A wired LAN I/F 212 is connected to a network cable (not shown), and executes communication (wired communication) with an external device. A wireless LAN I/F 213 executes wireless communication with an external device such as a PC or a mobile terminal. The analog audio input/output device 216 and the USB audio input/output device 217 are audio input/output devices such as a speaker or a microphone.

Figure 3:
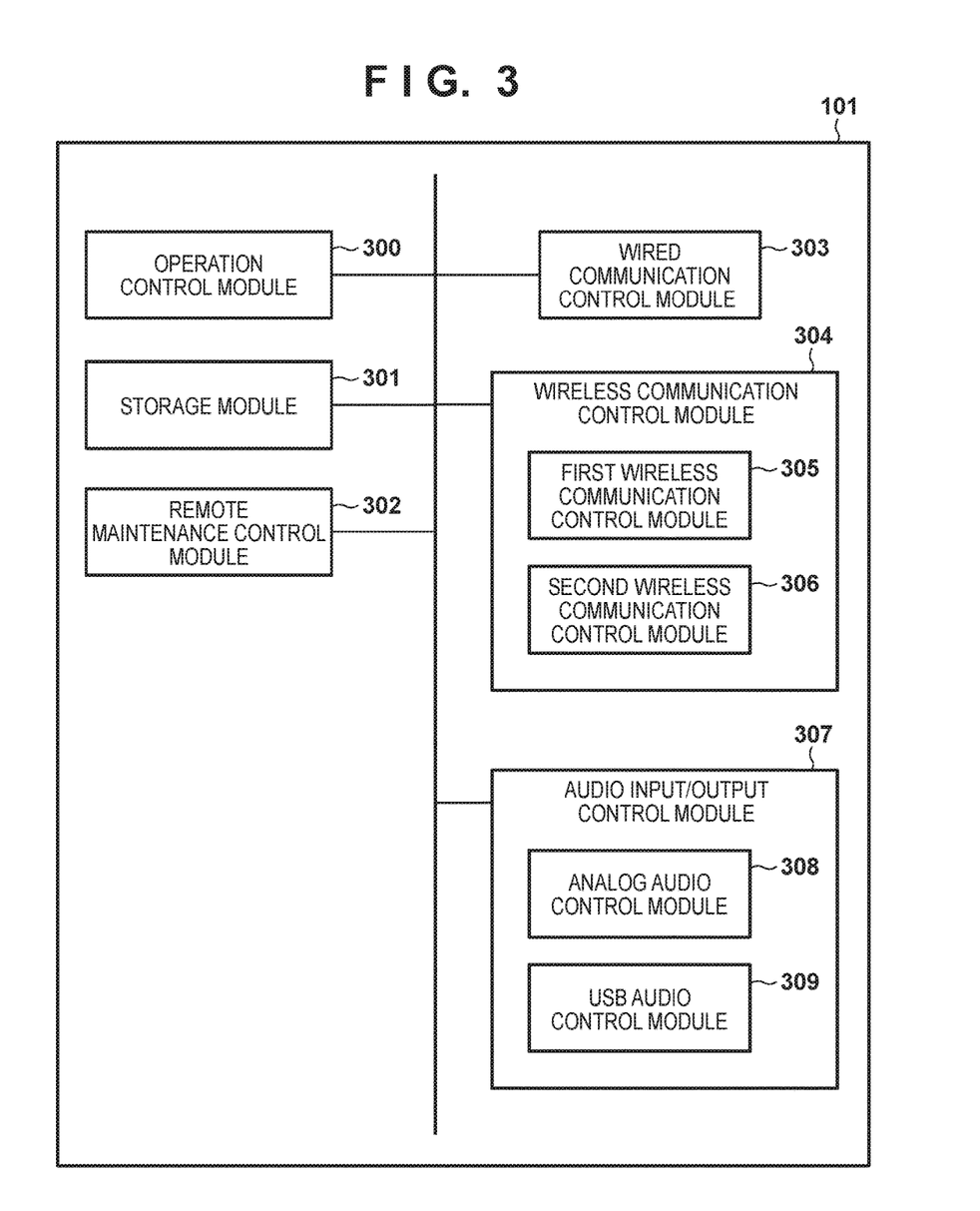
FIG. 3 is a functional block diagram for describing a software configuration of the image forming apparatus according to the first embodiment.

FIG. 3 is a functional block diagram for describing a software configuration of the image forming apparatus 101 according to the first embodiment. Note that each functional module illustrated in FIG. 3 is realized on the image forming apparatus 101 by the CPU 202 executing a control program (a module) that the CPU 202 deployed to the RAM 204 from the ROM 203 or the HDD 205.

An operation control module 300 controls the operation panel 214. The operation control module 300 displays an operation menu on the operation panel 214 via the operation panel I/F 208, and awaits an input of an instruction from a user. In addition, the operation control module 300 notifies details of an instruction received by the operation panel 214 to another functional unit, and displays an instruction result to the operation panel 214. A storage module 301, in accordance with an instruction from another functional module, causes designated data to be stored in the RAM 204 or the HDD 205, or reads stored data from the RAM 204 or the HDD 205.

A remote maintenance control module 302 controls a remote maintenance function. The remote maintenance control module 302 performs HTTP communication with the relay server 102 via a wired communication control module 303, and transmits and receives audio data, video data, or remote control data. In addition, the remote maintenance control module 302 inputs/outputs audio data with respect to the analog audio input/output device 216 or the USB audio input/output device 217, via an audio input/output control module 307. A configuration of the audio input/output control module 307 is described later. In addition, the remote maintenance control module 302 displays video data on the operation panel 214, via the operation control module 300. Furthermore, upon receiving still image data or a video captured by the terminal apparatus 103 via the relay server 102, the remote maintenance control module 302 requests the operation control module 300 to display the received video or still image data on the operation panel 214. Accordingly, the operation control module 300 displays video or a still image on the operation panel 214, via the operation panel I/F 208. The remote maintenance control module 302 also performs a remote operation by communicating with the operation control module 300 based on remote control data. An example of remote control data may be data communicated by a VNC (Virtual Network Computing) protocol. The remote maintenance control module 302 transmits an operation command to the operation control module 300, in accordance with the VNC protocol. Accordingly, the operation control module 300 makes an operation with respect to the operation panel 214 via the operation panel I/F 208, and in accordance with the sent operation command. By this processing by the remote maintenance control module 302, the terminal apparatus 103, which is connected to the relay server 102, can perform remote maintenance of the image forming apparatus 101.

Furthermore, by wireless communication via a wireless communication control module 304, the remote maintenance control module 302 can input/output audio data between the mobile terminal 108 and the image forming apparatus 101. Accordingly, the user 106 can make an audio call with the operator 107 of the call center by using the mobile terminal 108. The wireless communication has a first wireless communication mode and a second wireless communication mode. In the first wireless communication mode, when the image forming apparatus 101 performs wireless communication with an external device such as the mobile terminal 108, the image forming apparatus 101 and the mobile terminal 108 perform wireless communication via a different access point (not shown). A first wireless communication control module 305 controls the first wireless communication mode. In the second wireless communication mode, when the image forming apparatus 101 performs wireless communication with an external device such as the mobile terminal 108, it uses Wi-Fi Direct to perform direct wireless communication. In the second wireless communication mode, when the image forming apparatus 101 communicates with the mobile terminal 108, for example, one of these operates as an access point, and the other operates as a client. Accordingly, the image forming apparatus 101 and the mobile terminal 108 make a wireless connection and then perform direct communication. A second wireless communication control module 306 controls the second wireless communication mode.

The audio input/output control module 307 provides a device driver for inputting and outputting audio data with an audio device. An example of a device driver may be ALSA (Advanced Linux Sound Architecture) or OSS (Open Sound System). An analog audio control module 308 and a USB audio control module 309 are present as part of the audio input/output control module 307. By these control modules, it is possible to input and output audio data by the analog audio input/output I/F 210, and it is also possible to input and output audio data by the USB I/F 211. By which I/F inputting or outputting is performed depends on which of the analog audio input/output device 216 and the USB audio input/output device 217 is first attached to the corresponding I/F.

Figure 4A:
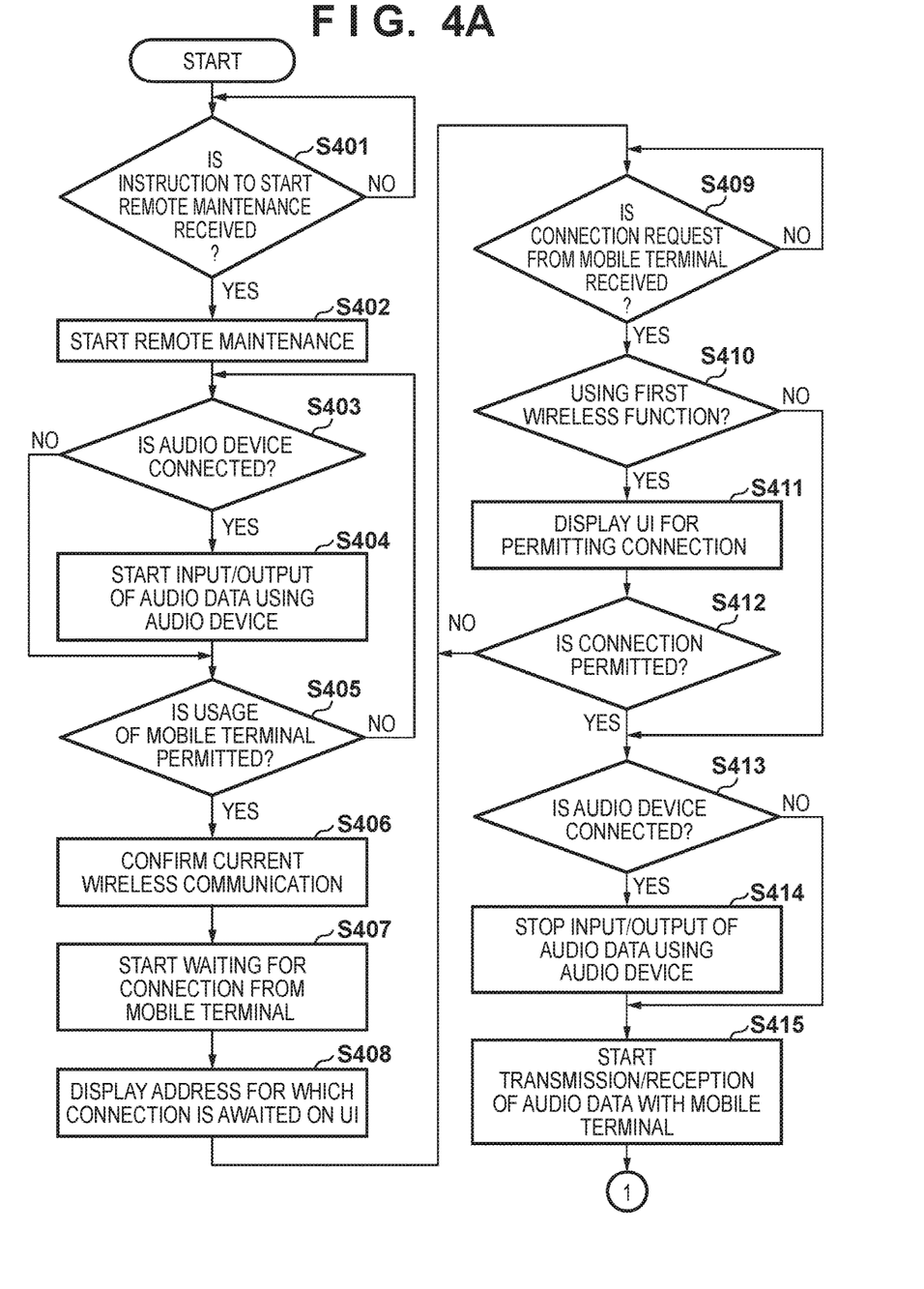
FIGS. 4A and 4B are flowcharts for describing processing of the image forming apparatus according to the first embodiment of the present invention.
Figure 4B:
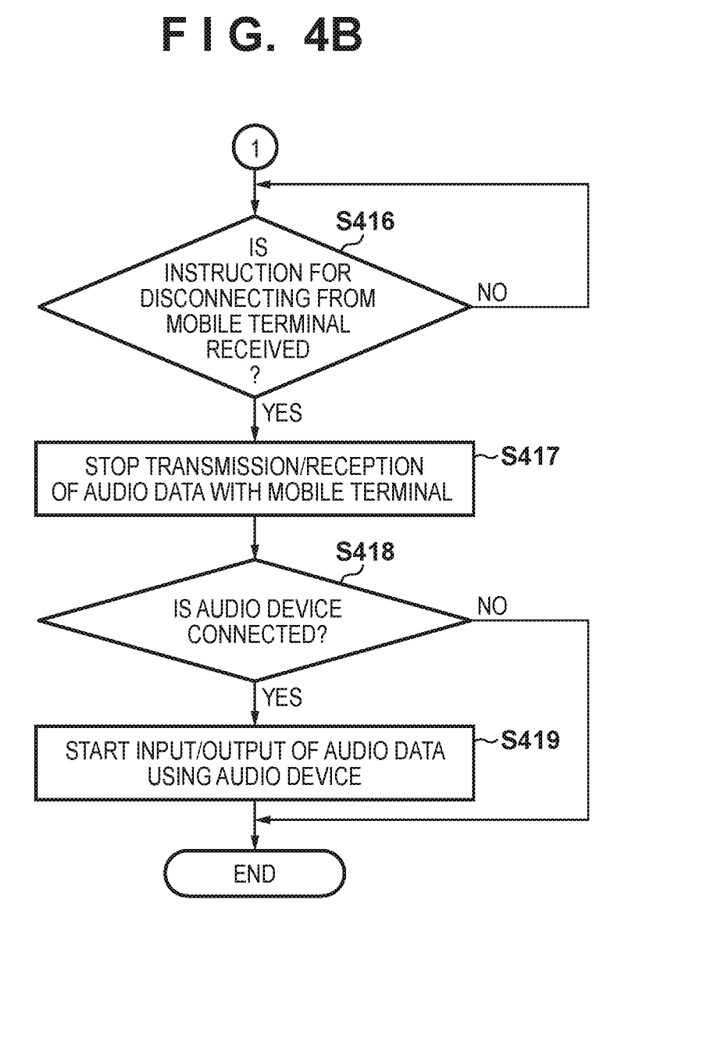

FIGS. 4A and 4B are flowcharts for describing processing of the image forming apparatus 101 according to the first embodiment of the present invention. Note that processing of each step of the flowchart of FIGS. 4A and 4B is implemented by the CPU 202 deploying a control program stored in the ROM 203 or the HDD 205 into the RAM 204, and executing the control program.

Firstly, in step S401 the CPU 202 determines whether or not a start instruction for remote maintenance has been inputted by the user 106 via the operation panel 214. When the instruction is inputted here, the processing proceeds to step S402 and remote maintenance starts, but when that is not the case the processing returns to step S401. When the remote maintenance is started in step S402, the processing proceeds to step S403, and the CPU 202 determines which of the analog audio input/output device 216 and the USB audio input/output device 217 is attached—in other words whether or not an audio device is connected. When it is determined in step S403 that an audio device is connected, the processing proceeds to step S404, and the CPU 202 uses the attached analog audio input/output device 216 or USB audio input/output device 217 to input/output audio data, and the processing proceeds to step S405. Meanwhile, if it is determined in step S403 that an audio device is not connected, the processing proceeds to step S405.

In step S405, the CPU 202 determines, in accordance with a content stored by the storage module 301, whether or not a "Use mobile terminal at a time of remote maintenance" setting is set to "permitted". Setting of the "Use mobile terminal at a time of remote maintenance" may be "permitted" or "not permitted". It is assumed that this setting is set in advance via the operation panel 214, and details thereof are saved by the storage module 301. When "permitted" is determined in step S405, the processing proceeds to step S406, but when "permitted" is not determined, the processing proceeds to step S403. In step S406, the CPU 202 confirms whether a wireless communication mode that is presently operating is the first wireless communication mode or the second wireless communication mode. Next, the processing proceeds to step S407, and the CPU 202 requests the control module corresponding to the wireless communication mode confirmed in step S406 (the first or the second wireless communication control module 305 or 306) to start processing to wait for a connection from the mobile terminal 108. Here, a protocol used for communication with the mobile terminal 108 may be SIP (Session Initiation Protocol) or HTTP as examples, but may be another protocol. The processing proceeds to step S408, and the CPU 202 displays information of the address that it is waiting to connect to on the operation panel 214. This address information may be in a URL format or another format. It may be displayed as text and may be displayed as a bar code or a QR code.

Next, the processing proceeds to step S409, and the CPU 202 determines whether or not a connection request has been received from the mobile terminal 108. When the connection request is received, the processing proceeds to step S410, and the CPU 202 determines whether the wireless communication mode for the time when the connection request was received is the first wireless communication mode (infrastructure mode) or the second wireless communication mode (direct wireless communication). Meanwhile, when the connection request is not received in step S409, the CPU 202 returns the processing to step S409.

A flow regarding operation of the mobile terminal 108 at this point is described below.

The user 106 of the image forming apparatus 101 opens a Wi-Fi setting screen of the mobile terminal 108 to find a Wi-Fi access point. When a found Wi-Fi access point is a Wi-Fi access point that is publicized on the network of the user environment 100, the image forming apparatus 101 is connected to in the first wireless communication mode. In addition, if the found Wi-Fi access point is a Wi-Fi access point of the image forming apparatus 101, the image forming apparatus 101 is connected to in the second wireless communication mode. The user 106 selects the found Wi-Fi access point on the mobile terminal 108, and inputs password information for the connection. Accordingly, the Wi-Fi access point verifies the password, and if it is correct, establishes a Wi-Fi connection with the mobile terminal 108. The user 106 then performs a connection operation, from the mobile terminal 108, with respect to the address that was displayed on the operation panel 214 of the image forming apparatus 101 in step S408. Description is given of a connection that uses SIP, as an example. The user 106 registers, into an address book of the mobile terminal 108, SIP URL information that was displayed on the operation panel 214 in step S408. The user 106, by the mobile terminal 108, activates a SIP application, selects the registered SIP URL, and performs a call operation. In this way, the image forming apparatus 101, in step S409, detects the connection request from the mobile terminal 108.

In step S410, upon determining the first wireless communication mode, the CPU 202 advances the processing to step S411, displays a screen prompting input of connection permission on the operation panel 214, and the processing proceeds to step S412. In the first wireless communication mode, a plurality of external devices can connect to an access point that exists separately. Accordingly, the connection request received in step S409 may be from an external device with which a connection is not desired. Therefore, in the case of the first wireless communication mode, there is a need to display on the operation panel 214 a screen for determining whether or not to permit a connection in step S411, and have the user 106 make a determination.

Meanwhile, when the CPU 202 determines the second wireless communication mode in step S410, the processing proceeds to step S413. Because the second wireless communication mode is a method for the mobile terminal 108 and the image forming apparatus 101 to make a direct connection, and because it is possible to identify in step S409 that the received connection is with the mobile terminal 108, a determination by a user of whether or not to permit the connection is unnecessary. In step S412, the CPU 202 determines whether or not connection permission has been instructed via the operation panel I/F 208, and the processing proceeds to step S413 if there is an instruction to permit the connection, and otherwise the processing returns to step S409.

In step S413, the CPU 202 determines whether or not the analog audio input/output device 216 or the USB audio input/output device 217—in other words an audio device—is connected. When it is determined in step S413 that an audio device is connected, the processing proceeds to step S414, and the CPU 202 stops input and output of audio data with respect to the analog audio input/output device 216 or the USB audio input/output device 217, and the processing proceeds to step S415. This is to switch input and output of audio data from the audio device to the mobile terminal 108. Meanwhile, if it is determined in step S413 that an audio device is not connected, the processing proceeds to step S415.

In step S415, the CPU 202 starts processing for transmitting and receiving audio data with respect to the mobile terminal 108 by wireless communication. Note that an example of a protocol used when the CPU 202 transmits and receives audio data with respect to the mobile terminal 108 may be RTP (Real-Time Transport Protocol). It also may be another protocol. Next, the processing proceeds to step S416, and the CPU 202 determines whether or not an instruction to disconnect communication has been received from the mobile terminal 108, and when such an instruction has been received, the processing advances to step S417, and the CPU 202 stops transmission/reception of audio data with the mobile terminal 108 by wireless communication. Meanwhile, when a disconnection instruction is not received in step S416, the processing returns to step S416. In step S418, the CPU 202 determines whether or not the analog audio input/output device 216 or the USB audio input/output device 217—in other words an audio device—is connected. When it is determined here that the audio device is connected, the processing proceeds to step S419, and the CPU 202 inputs/outputs audio data by using the analog audio input/output device 216 or the USB audio input/output device 217. Meanwhile, when it is determined in step S418 that the audio device is not connected, the CPU 202 skips the processing of step S419, and this processing ends.

By virtue of the first embodiment as described above, upon receiving a connection request from the mobile terminal 108, the image forming apparatus 101 switches a target for input and output of audio data to the mobile terminal 108. Accordingly, the user 106 of the image forming apparatus 101 can continue an audio call with the operator 107, even after separating from the location of the image forming apparatus 101.

Furthermore, upon receiving a connection request from the mobile terminal 108, the image forming apparatus 101 displays on the operation panel 214 a screen for confirming permission in the case of a wireless communication mode where connection requests are received from an unspecified large number of external devices. Because of this, it is possible to avoid input and output of audio data with an external device with which input/output is not intended.

Furthermore, when an instruction to disconnect communication is received from the mobile terminal 108, the image forming apparatus 101 returns a target for input and output of audio data to the audio device that was used before switching. By this, when the user 106 desires to return to an audio call by the audio device of the image forming apparatus 101, the user 106 can return to the original audio device by performing processing for disconnecting from the mobile terminal 108.

Second Embodiment

Next, description is given regarding a second embodiment of the present invention. In the first embodiment previously described, there was a configuration in which Wi-Fi was used as a wireless communication technique, but, in the second embodiment, description is given by an example in which Bluetooth (registered trademark) for which a pairing operation is necessary is used as the wireless communication technique. Note that, something other than Bluetooth may be used as the wireless communication technique if it involves a pairing operation.

Figure 5A:
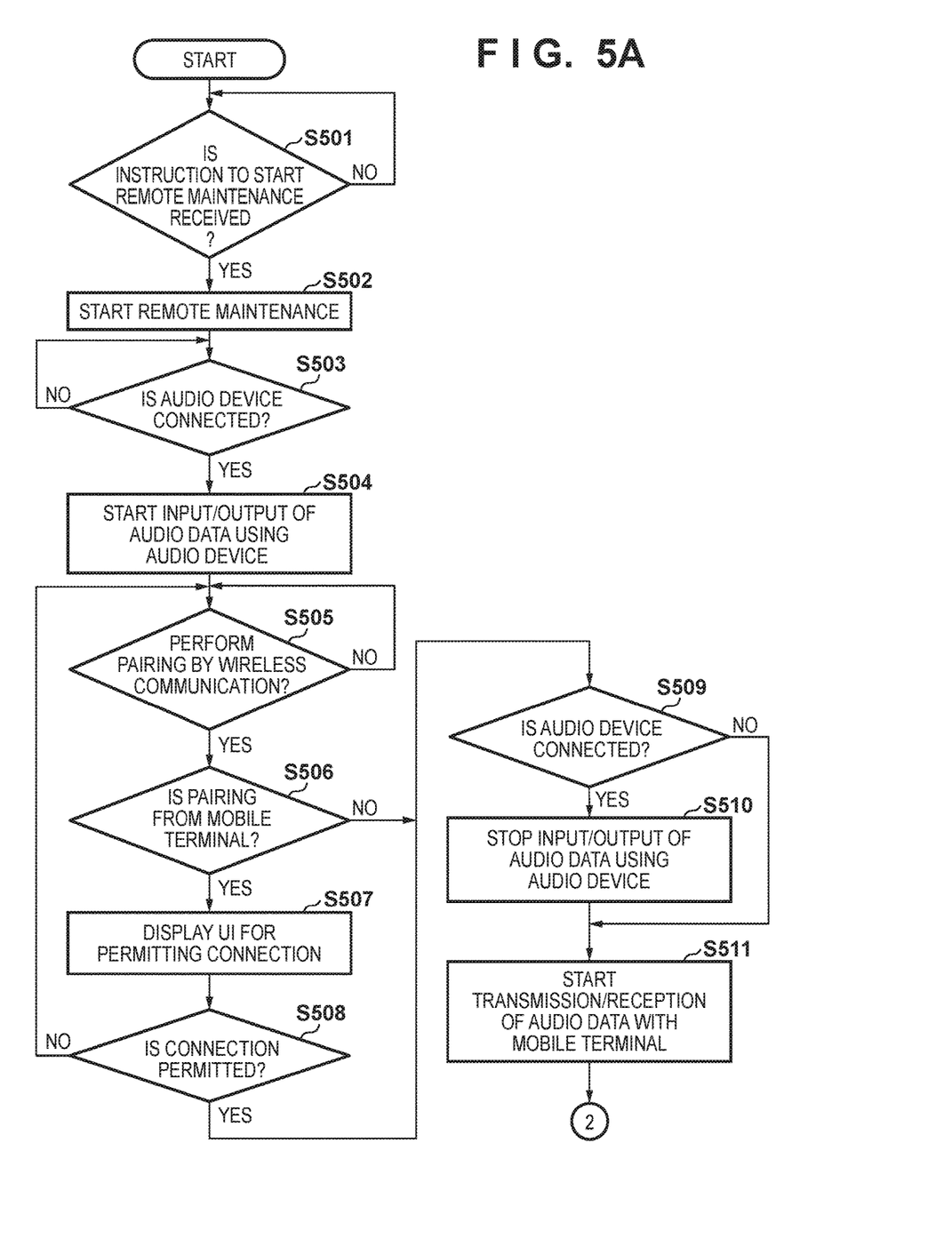
FIGS. 5A and 5B are flowcharts for describing processing of the image forming apparatus according to a second embodiment of the present invention.
Figure 5B:
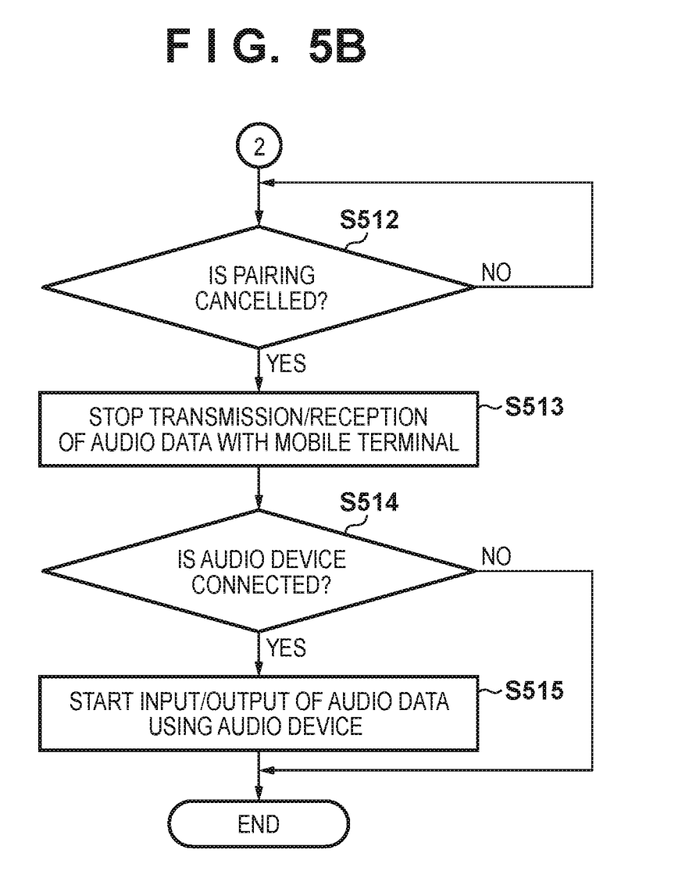

FIGS. 5A and 5B are flowcharts for describing processing of the image forming apparatus 101 according to the second embodiment of the present invention. Note that processing of each step illustrated in FIGS. 5A and 5B is implemented by the CPU 202 deploying a control program stored in the ROM 203 or the HDD 205 to the RAM 204, and executing the control program. Note that, because processing of step S501 through step S504 of FIG. 5A is similar to the processing of step S401 through step S404 of FIG. 4A according to the first embodiment, description thereof is omitted.

In step S505, the CPU 202 determines whether or not pairing with a partner terminal has been performed by wireless communication. This pairing is work for connecting devices that support Bluetooth to each other. In the second embodiment, there is a configuration in which the image forming apparatus 101 is the master and the mobile terminal 108 is the slave, but the reverse configuration may be taken. When the image forming apparatus 101 is the master, the user performs pairing by selecting the mobile terminal 108 on the operation panel 214 of the image forming apparatus 101. Meanwhile, when the mobile terminal 108 is the master, the user performs pairing by selecting the image forming apparatus 101 on a UI of the mobile terminal 108.

In step S505, when the CPU 202 determines that pairing with the partner terminal has been performed, the processing proceeds to step S506, and the CPU 202 determines whether or not pairing was performed from the mobile terminal 108. Meanwhile, when it is determined in step S505 that pairing has not been performed, the processing returns to step S505. In step S506, when the CPU 202 determines that pairing was performed from the mobile terminal 108, the processing proceeds to step S507, but when the CPU 202 determines that pairing was not performed from the mobile terminal 108, the processing proceeds to step S509. Note that, because processing of step S507 through step S511 is similar to the processing of step S411 through step S415 of FIG. 4A described above, description thereof is omitted.

In step S512, the CPU 202 determines whether or not pairing is canceled. Cancellation of the pairing can be performed from the image forming apparatus 101, or can be performed from the mobile terminal 108. When it is determined in step S512 that pairing is cancelled, the processing proceeds to step S513, and the CPU 202 stops transmission/reception of audio data with the mobile terminal 108 by wireless communication, similarly to in step S417 of FIG. 4B. Meanwhile, when it is determined in step S512 that pairing has not been cancelled, the processing returns to step S512. Note that, because processing of step S514 through step S515 is similar to the processing of step S418 through step S419 of FIG. 4B, description thereof is omitted.

By virtue of the second embodiment as described above, even in a case of close proximity wireless communication that accompanies a pairing operation, the image forming apparatus 101 can switch a target for input and output of audio data to the mobile terminal 108. By this, the user 106 of the image forming apparatus 101 can continue an audio call with the operator 107 by using, for example, a headset that supports Bluetooth, even after separating from the location of the image forming apparatus 101.

Furthermore, the image forming apparatus 101 displays on the operation panel 214 a screen for confirming connection permission when a pairing operation is performed from the mobile terminal 108. Because of this, it is possible to avoid input and output of audio data with an external device with which input/output is not intended.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-237091, filed Dec. 6, 2016, which is hereby incorporated by reference herein in its entirety.

What is claimed is:

1. A communication system, in which an image forming apparatus and an information processing apparatus are connected via a network and remote maintenance is performed between the image forming apparatus and the information processing apparatus,
wherein the image forming apparatus comprises:
a first wireless communication unit that wirelessly communicates with a plurality of mobile terminals;
a second wireless communication unit that directly communicates with a mobile terminal;
a display;
a memory that stores a set of instructions; and
at least one processor that executes the instructions to:
control the remote maintenance with the information processing apparatus;
perform wireless communication with a mobile terminal;
determine whether or not the remote maintenance is possible using the mobile terminal;
control to, in a case that it is determined that the remote maintenance is possible, establish wireless communication with the mobile terminal in response to a connection request from the mobile terminal, and perform input and output of audio data via the mobile terminal with the information processing apparatus;
determine whether the established wireless communication with the mobile terminal is by the first wireless communication unit or the second wireless communication unit;
in a case that it is determined that the wireless communication with the mobile terminal is by the first wireless communication unit, display on the display a screen for requesting permission for a connection with the mobile terminal; and
in a case that it is determined that the wireless communication with the mobile terminal is by the second wireless communication unit, not display on the display the screen.

2. The communication system according to claim 1, wherein the image forming apparatus further comprises:
a connector that connects to an audio device; and
wherein the at least one processor executes the instructions in the memory device to:
determine whether or not the audio device is connected via the connector;
wherein, in a case that it is determined that the audio device is connected to the connector, stop input and output of audio data with respect to the audio device connected via the connector in the remote maintenance using the mobile terminal.

3. The communication system according to claim 1, wherein the first wireless communication unit performs wireless communication by an infrastructure mode, and the second wireless communication unit performs direct wireless communication.

4. The communication system according to claim 1, wherein the at least one processor executes the instructions in the memory device to:
upon establishing the wireless communication with the mobile terminal, determine whether the wireless communication with the mobile terminal is established in accordance with a pairing operation by the image forming apparatus or is established in accordance with a pairing operation by the mobile terminal; and
display on the display a screen for requesting permission for a connection in a case that it is determined that the wireless communication is established in accordance with the pairing operation by the mobile terminal.

5. An image forming apparatus operable to connect to an information processing apparatus via a network and capable of receiving remote maintenance from the information processing apparatus, the image forming apparatus comprising:
a first wireless communication unit that wirelessly communicates with a plurality of mobile terminals;
a second wireless communication unit that directly communicates with a mobile terminal;
a display;
a memory device that stores a set of instructions; and
at least one processor that executes the instructions to:
control the remote maintenance with the information processing apparatus;
perform wireless communication with a mobile terminal;
determine whether or not the remote maintenance is possible using the mobile terminal; and
control to, in a case that it is determined that the remote maintenance is possible, establish wireless communication with the mobile terminal in response to a connection request from the mobile terminal, and perform input and output of audio data via the mobile terminal with the information processing apparatus;
determine whether the established wireless communication with the mobile terminal is by the first wireless communication unit or the second wireless communication unit;
in a case that it is determined that the wireless communication with the mobile terminal is by the first wireless communication unit, display on the display a screen for requesting permission for a connection with the mobile; and
in a case that it is determined that the wireless communication with the mobile terminal is by the second wireless communication unit, not display on the display the screen.

6. The image forming apparatus according to claim 5, further comprising:
a connector that connects to an audio device;
wherein the at least one processor executes the instructions in the memory device to:
determine whether or not the audio device is connected via the connection unit; and
in a case that it is determined that the audio device is connected via the connector, stop input and output of audio data with respect to the audio device connected via the connector in the remote maintenance using the mobile terminal.

7. The image forming apparatus according to claim 5, wherein the first wireless communication unit performs wireless communication by an infrastructure mode, and the second wireless communication unit performs direct wireless communication.

8. The image forming apparatus according to claim 5, wherein the at least one processor executes the instructions in the memory device to:
upon establishing the wireless communication with the mobile terminal, determine whether the wireless communication with the mobile terminal is established in accordance with a pairing operation by the image forming apparatus or is established in accordance with a pairing operation by the mobile terminal; and control to display on the display a screen for requesting permission for a connection in a case that it is determined that the wireless communication is established in accordance with the pairing operation by the mobile terminal.

9. A method of controlling an image forming apparatus connected to an information processing apparatus via a network and having a remote maintenance control unit for controlling remote maintenance with the information processing apparatus and a first wireless communication unit for wirelessly communicating with a plurality of mobile terminals and a second wireless communication unit for directly communicating with a mobile terminal, and operable to receive remote maintenance from the information processing apparatus, the method comprising:

determining whether or not the remote maintenance is possible using the mobile terminal; and
  controlling to, in a case that the remote maintenance is determined to be possible, establish wireless communication with the mobile terminal by the wireless communication unit in response to a connection request from the mobile terminal, and perform input and output of audio data via the remote maintenance control unit;
  determining whether the established wireless communication with the mobile terminal is by the first wireless communication unit or the second wireless communication unit;
  in a case that it is determined in the determining that the wireless communication with the mobile terminal is by the first wireless communication unit, displaying on a display a screen for requesting permission for a connection with the mobile terminal; and
  in a case that it is determined in the determining that the wireless communication with the mobile terminal is by the second wireless communication unit, not displaying on the display the screen.

10. A non-transitory computer-readable storage medium storing a program for causing a processor to execute a method of controlling an image forming apparatus connected to an information processing apparatus via a network and having a remote maintenance control unit for controlling remote maintenance with the information processing apparatus and a first wireless communication unit for wirelessly communicating with a plurality of mobile terminals and a second wireless communication unit for directly communicating with a mobile terminal, and operable to receive remote maintenance from the information processing apparatus, the method comprising:

determining whether or not the remote maintenance is possible using the mobile terminal; and
  controlling to, in a case that the remote maintenance is determined to be possible, establish wireless communication with the mobile terminal by the wireless communication unit in response to a connection request from the mobile terminal, and perform input and output of audio data via the remote maintenance control unit;
  determine whether the established wireless communication with the mobile terminal is by the first wireless communication unit or the second wireless communication unit;
  in a case that it is determined in the determining that the wireless communication with the mobile terminal is by the first wireless communication unit, displaying on a display a screen for requesting permission for a connection with the mobile terminal; and
  in a case that it is determined in the determining that the wireless communication with the mobile terminal is by the second wireless communication unit, not displaying on the display the screen.

* * * * *